United States Patent
Hundal et al.

(10) Patent No.: US 10,150,673 B2
(45) Date of Patent: Dec. 11, 2018

(54) SYSTEMS AND METHODS FOR ENABLING COMMUNICATION BETWEEN USB TYPE-C CONNECTIONS AND LEGACY CONNECTIONS OVER AN EXTENSION MEDIUM

(71) Applicant: Icron Technologies Corporation, Burnaby (CA)

(72) Inventors: Sukhdeep Singh Hundal, Surrey (CA); Remco van Steeden, Vancouver (CA)

(73) Assignee: Icron Technologies Corporation, Burnaby (CA)

( * ) Notice: Subject to any disclaimer, the term of this patent is extended or adjusted under 35 U.S.C. 154(b) by 0 days.

(21) Appl. No.: 15/714,851

(22) Filed: Sep. 25, 2017

(65) Prior Publication Data
US 2018/0009666 A1   Jan. 11, 2018

Related U.S. Application Data

(62) Division of application No. 14/931,734, filed on Nov. 3, 2015, now Pat. No. 9,798,689.
(Continued)

(51) Int. Cl.
*C01B 32/05* (2017.01)
*C04B 35/626* (2006.01)
(Continued)

(52) U.S. Cl.
CPC ............. *C01B 32/05* (2017.08); *C04B 35/524* (2013.01); *C04B 35/6269* (2013.01);
(Continued)

(58) Field of Classification Search
CPC ............... G06F 13/385; G06F 13/4045; G06F 2213/0042; G06F 13/4081; G06F 13/4282;
(Continued)

(56) References Cited

U.S. PATENT DOCUMENTS 6,381,666 B1   4/2002   Kejser et al.
7,149,833 B2   12/2006  McLeod
(Continued)

OTHER PUBLICATIONS

"Universal Serial Bus 3.1 Specification," Revision 1.0, Jul. 26, 2013, Hewlett-Packard Company, Intel Corporation, Microsoft Corporation, Renesas Corporation, ST-Ericsson, and Texas Instruments, 631 pages.
(Continued)

*Primary Examiner* — Michael E Teitelbaum
(74) *Attorney, Agent, or Firm* — Christensen O'Connor Johnson Kindness PLLC (57) ABSTRACT

Techniques for supporting USB and video communication over an extension medium are provided. In some embodiments, an upstream facing port device (UFP device) is coupled to legacy connectors of a host device, and a downstream facing port device (DFP device) is coupled to a USB Type-C receptacle of the sink device that may provide both USB and DisplayPort information. The UFP device and DFP device communicate to properly configure the USB Type-C connection for use in the extension environment. In some embodiments, a source device is coupled to the UFP device via a USB Type-C connection, and legacy video and USB devices are coupled to the DFP device. The UFP device and DFP device again communicate to cause the source device to properly configure the USB Type-C connection for use in the extension environment.

18 Claims, 6 Drawing Sheets

Related U.S. Application Data (60) Provisional application No. 62/074,516, filed on Nov. 3, 2014.

(51) Int. Cl.
*C04B 35/524* (2006.01)
*C04B 35/634* (2006.01)
*C08G 59/68* (2006.01)

(52) U.S. Cl.
CPC ...... *C04B 35/63452* (2013.01); *C08G 59/687* (2013.01); *C04B 2235/602* (2013.01); *C04B 2235/6022* (2013.01); *C04B 2235/6025* (2013.01); *C04B 2235/6027* (2013.01); *C04B 2235/658* (2013.01); *C04B 2235/6562* (2013.01); *C04B 2235/662* (2013.01)

(58) Field of Classification Search
CPC ............ G06F 13/4022; Y02B 60/1228; Y02B 60/1235; G09G 2370/12; G09G 5/006; G09G 2370/02
See application file for complete search history.

(56) References Cited

U.S. PATENT DOCUMENTS

| | | | |
|---|---|---|---|
| 8,549,197 B2 | 10/2013 | Hall et al. | |
| 8,615,611 B2 | 12/2013 | Hall | |
| 8,788,734 B2 | 7/2014 | Sosniak | |
| 8,868,792 B2 | 10/2014 | Schultz et al. | |
| 9,047,418 B2 | 6/2015 | Hall | |
| 9,129,064 B2 | 9/2015 | Toivanen et al. | |
| 2006/0020736 A1 | 1/2006 | Jackson | |
| 2011/0243035 A1* | 10/2011 | Hall ................... H04L 5/1415 370/276 |
| 2014/0129738 A1 | 5/2014 | Hussain | |
| 2015/0269102 A1 | 9/2015 | Inha et al. | |

OTHER PUBLICATIONS

"Universal Serial Bus Specification," Revision 2.0, Apr. 27, 2000, Compaq Computer Corporation, Hewlett-Packard Company, Intel Corporation, Lucent Technologies Inc, Microsoft Corporation, NEC Corporation, and Koninklijke Philips Electronics N.V., 650 pages.
"Universal Serial Bus Power Delivery Specification," Revision 2.0, V1.1, May 7, 2015, Hewlett-Packard Company, Intel Corporation, LSI Corporation, Microsoft Corporation, Renesas, ST-Microelectronics, and Texas Instruments, 544 pages.
"Universal Serial Bus Type-C Cable and Connector Specification," Revision 1.1, Apr. 3, 2015, USB 3.0 Promoter Group, 180 pages.
"VESA DisplayPort Alt Mode for USB Type-C Standard: Feature Summary," PowerPoint presentation, Sep. 22, 2014, VESA, <http://www.displayport.org/wp-content/uploads/2014/09/DP-Alt-Mode-Overview-for-VESA-v1.pdf>, [retrieved Dec. 31, 2015], 17 pages.

* cited by examiner

SYSTEMS AND METHODS FOR ENABLING COMMUNICATION BETWEEN USB TYPE-C CONNECTIONS AND LEGACY CONNECTIONS OVER AN EXTENSION MEDIUM

CROSS-REFERENCES TO RELATED APPLICATIONS

This application is a division of U.S. application Ser. No. 14/931,734, filed Nov. 3, 2015, which claims the benefit of U.S. Provisional Application No. 62/074,516, filed Nov. 3, 2014, each expressly incorporated herein by reference in its entirety.

BACKGROUND

USB is a peripheral interface for attaching a wide variety of computing devices, such as personal computers, digital telephone lines, monitors, modems, mice, printers, scanners, game controllers, keyboards, storage devices, and/or the like. The specifications defining USB (e.g., Intel et al., Universal Serial Bus Specification, Revision 1.0, January 1996; updated as Revision 1.1 in September 1998; further updated as Revision 2.0 in April 2000; further updated as Revision 3.0 in November 2008; and further updated as "Universal Serial Bus 3.1 Specification, Revision 1.0" on Jul. 26, 2013, by Hewlett-Packard Company et al., and subsequent updates and modifications—hereinafter collectively referred to as the "USB Specifications," which term can include future modifications and revisions) are non-proprietary and are managed by an open industry organization known as the USB Forum. The USB Specifications establish basic criteria that must be met in order for communication to comply with USB standards, and are incorporated herein in their entireties for all purposes. One of ordinary skill in the art will recognize many terms herein from the USB Specifications. Those terms are used herein in a similar manner to their use in the USB Specifications, unless otherwise stated.

Standards have been published that describe a universal serial bus (USB) Type-C connector, plug, and cable that can support communication via USB 2.0, SuperSpeed, and DisplayPort via the same connector, including concurrent communication of at least some of these signals. USB Type-C connectors, plugs, and cables are described in detail at least in "Universal Serial Bus Type-C Cable and Connector Specification, Revision 1.1," released on Apr. 3, 2015, by USB 3.0 Promoter Group. Power delivery over USB and the negotiation thereof is described in detail at least in "Universal Serial Bus Power Delivery Specification, Revision 2.0, Version 1.1," released on May 7, 2015, by Hewlett-Packard Company et al. DisplayPort communication is described in detail at least in "VESA DisplayPort Standard, Version 1.3," released on Sep. 15, 2015, by VESA. Communication of DisplayPort information over a USB Type-C interface is described in detail at least in the VESA DisplayPort Alt Mode Standard, Version 1, released on Sep. 22, 2014, by VESA. Each of these documents and their contents are known to one of ordinary skill in the art, and are hereby incorporated by reference herein along with any earlier versions or related documents mentioned therein in their entireties for all purposes.

Techniques have been used to extend communication of video information over extension media, and also to extend communication of USB information over extension media. With the advent of USB Type-C connections and the incremental nature of their adoption, it is desirable to be able to connect a USB Type-C source or sink to a corresponding legacy sink or legacy source across an extension medium. However, problems arise when attempting to establish such connections across an extension medium. What is needed are techniques and devices for addressing these problems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system comprising an upstream facing port device (UFP device) and a downstream facing port device (DFP device) is provided. The UFP device includes a USB upstream facing port and a video receptacle. The DFP device includes a USB Type-C downstream facing port. The UFP device and the DFP device are configured to communicate via an extension medium. The UFP device and the DFP device are further configured to enable a host device coupled to the UFP device and a USB and DisplayPort sink device coupled to the DFP device to communicate USB and video information via the extension medium.

In some embodiments, a method of enabling a host device coupled to an upstream facing port device (UFP device) via a USB upstream facing port of the UFP device and a video receptacle of the UFP device to communicate USB information and video information with a USB and DisplayPort sink device coupled to a USB Type-C downstream facing port of a downstream facing port device (DFP device) is provided. The UFP device and the DFP device are configured to communicate via an extension medium. The DFP device receives a structured vendor defined message from the USB and DisplayPort sink device that represents a hot plug detect (HPD) signal. The DFP device transmits, to the UFP device, a message via the extension medium indicating the presence of the USB and DisplayPort sink device. In response to receiving the message, the UFP device transmits an attachment message to the host device.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
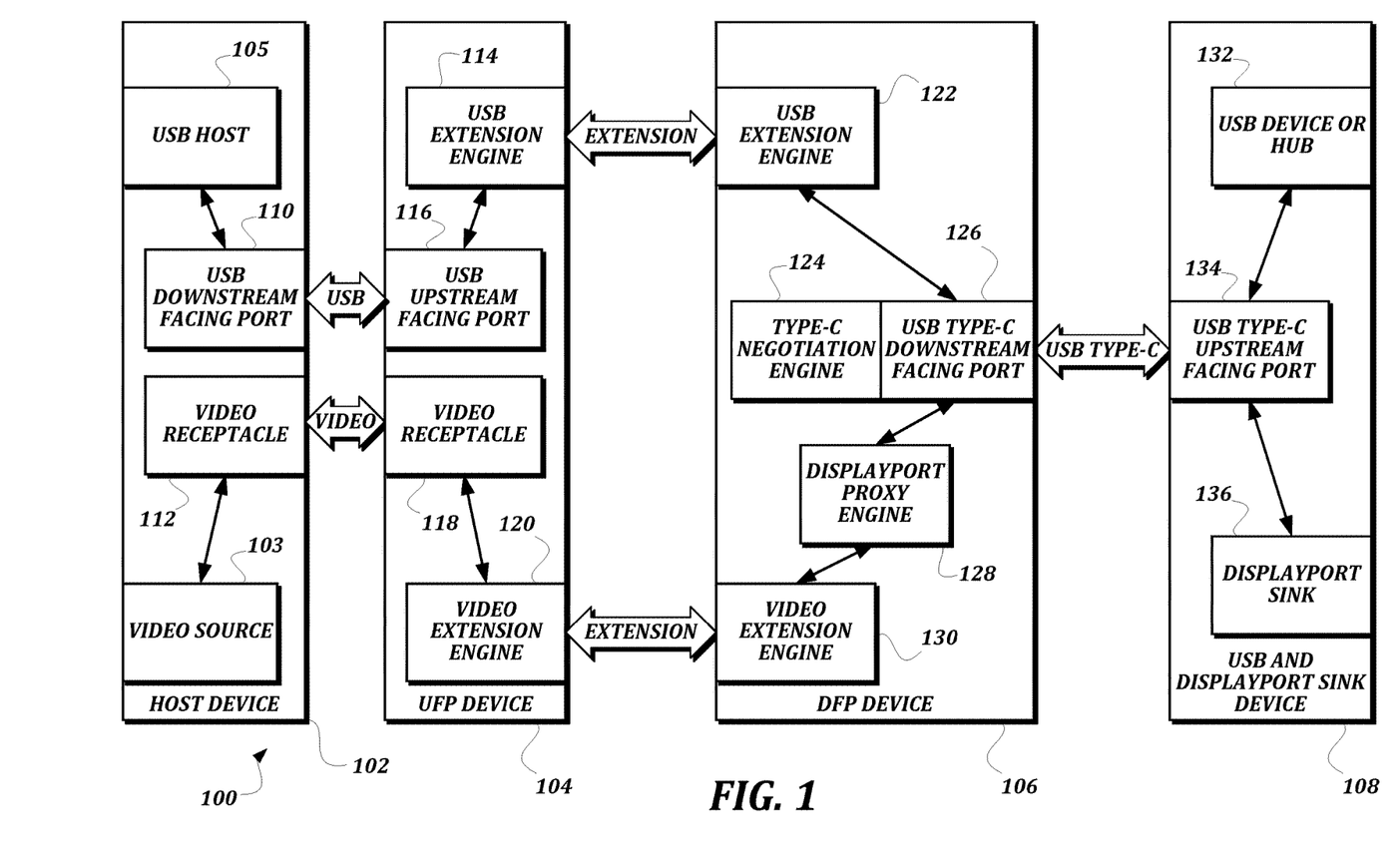
FIG. 1 is a block diagram that illustrates an exemplary embodiment of a system for enabling communication over an extension medium between a legacy host device and a USB and DisplayPort sink device having a USB Type-C receptacle according to various aspects of the present disclosure.

FIG. 1 is a block diagram that illustrates an exemplary embodiment of a system for enabling communication over an extension medium between a legacy host device and a USB and DisplayPort sink device having a USB Type-C receptacle according to various aspects of the present disclosure. As illustrated, the system 100 includes a host device 102, an upstream facing port device 104 (also called a UFP device, or in some cases, a local extender or LEX), a downstream facing port device 106 (also called a DFP device, or in some cases, a remote extender or REX), and a USB and DisplayPort sink device 108. Though a single host device 102 is illustrated, in some embodiments a first host device that includes the USB host 105 and a separate, second host device that includes the video source 103 may be used.

In some embodiments, the host device 102 may be any type of computing device that includes the illustrated components, including but not limited to a laptop computing device, a desktop computing device, a tablet computing device, and/or any other type of computing device that includes the illustrated elements. In some embodiments, the host device 102 includes a USB downstream facing port 110 and a video receptacle 112. The USB downstream facing port 110 may be a USB downstream facing port compatible with any USB specification, including without limitation USB 1.0, USB 1.1, USB 2.0, USB 3.0, and USB 3.1. In some embodiments, the USB downstream facing port 110 could be a USB Type-C receptacle, so long as there is also a separate video receptacle 112.

In some embodiments, the video receptacle 112 is an output of a graphics processing unit, or GPU, of the host device 102, and is configured to output video signals. In some embodiments, the video receptacle 112 may be configured to output DisplayPort signals. In some embodiments, the video receptacle 112 may be configured to output any other type of video signal, including but not limited to VGA, HDMI, DVI, MHL, composite, component, S-Video, FireWire, or any other type of video signal. The connections offered by the host device 102 may be referred to herein as "legacy" connections because instead of sending the video signal and USB signal over a combined receptacle such as a USB Type-C receptacle, separate video and USB connectors are used.

The UFP device 104 includes a USB upstream facing port 116 and a video receptacle 118. In some embodiments, the USB version of the USB upstream facing port 116 matches the USB version of the USB downstream facing port 110, while in some embodiments, the USB versions implemented by the USB downstream facing port 110 and the USB upstream facing port 116 may be different. In some embodiments, the video receptacle 118 may match the video receptacle 112 of the host device 102. In some embodiments, the video receptacle 118 may be compatible with the video receptacle 112 of the host device 102 but not match it. For example, the video receptacle 118 may be a DisplayPort receptacle, while the video receptacle 112 is a DVI receptacle, a VGA receptacle, an HDMI receptacle, or any other type of receptacle that can communicate with a DisplayPort receptacle. In some embodiments, a standard USB cable connects the USB downstream facing port 110 with the USB upstream facing port 116, and a standard video cable (or video conversion adapter) connects the video receptacle 112 of the host device 1 02 with the video receptacle 118 of the UFP device 104.

The USB and DisplayPort sink device 108 includes a DisplayPort sink 136 and a USB device or hub 132. The USB and DisplayPort sink device 108 may be any type of device that includes a DisplayPort sink and a USB device or hub, including but not limited to a monitor having an embedded USB hub or device, a projector having an integrated input device, a communication hub, and/or the like.

The USB and DisplayPort sink device 108 provides connectivity to both the USB device or hub 132 and the DisplayPort sink 136 via a single USB Type-C upstream facing port 134. In some embodiments, the USB and DisplayPort sink device 108 may support concurrent USB and DisplayPort connectivity using techniques described in the DisplayPort Alt Mode Standard incorporated above. In some embodiments, other techniques may be used, such as those described in commonly owned, co-pending U.S. patent application Ser. No. 14/884,613, filed Oct. 15, 2015, and commonly owned, co-pending U.S. patent application Ser. No. 14/919,622, filed Oct. 21, 2015, the entire disclosures of which are hereby incorporated by reference herein for all purposes and referred to hereinafter as the "Concurrent DisplayPort and USB" applications.

The DFP device 106 includes a USB Type-C downstream facing port 126. The USB Type-C downstream facing port 126 is coupled to a USB Type-C upstream facing port 134 of the USB and DisplayPort sink device 108 via a cable. In some embodiments, the cable may be a standard USB Type-C cable. In some embodiments, such as the embodiments described in the Concurrent DisplayPort and USB applications, a non-standard cable may be used to carry additional signals.

The DFP device 106 also includes a Type-C negotiation engine 124. Because the DFP device 106 may support multiple configurations and multiple different types of data transfer via the USB Type-C downstream facing port 126, the Type-C negotiation engine 124 may be used to perform standard techniques such as cable orientation detection, but may also be used to determine capabilities of the USB and DisplayPort sink device 108 in order to inform the UFP device 104, to determine conductors to be used for various types of data, and/or the like. Further description of the actions performed by the Type-C negotiation engine 124 is provided below.

In some embodiments, the DFP device 106 includes a DisplayPort proxy engine 128. In some embodiments, the DisplayPort proxy engine 128 may emulate a DisplayPort source to the USB and DisplayPort sink device 108 to allow the DFP device 106 to retrieve capabilities from the DisplayPort sink 136. In some embodiments, the DisplayPort proxy engine 128 may be configured to translate video information from the host device 102 in some other format into a format that can be consumed by the DisplayPort sink 136. In some embodiments, the DisplayPort proxy engine 128 may simply forward information to and from the host device 102, if the host device 102 supports DisplayPort-compatible communication.

In some embodiments, the UFP device 104 and the DFP device 106 may be connected by an extension medium. The extension medium may increase the distance between the UFP device 104 and the DFP device 106 beyond that supported by the USB specifications and/or any relevant video communication standard. The extension medium may include a network that uses any suitable networking technique, including but not limited to Ethernet, Bluetooth, WiFi, WiMax, the Internet, serial communication, and/or the like, and any suitable communication medium, such as via physical cables, via wireless spectrum, via fiber-optic cable, and/or the like. In some embodiments, the UFP device 104 and the DFP device 106 may happen to be closer to each other than the maximum distances indicated by the USB specifications and/or any relevant video communication standard, and/or may be directly connected by a cable instead of via a network In order to support USB communication over the extension medium, the UFP device 104 includes a USB extension engine 114, and the DFP device 106 includes a USB extension engine 122. The USB extension engines 114, 122 may handle event timing issues, connection setup issues, and other issues that would otherwise prevent a USB host 105 from communicating with a USB device 132 over the extension medium, as discussed further below. In some embodiments, once a connection is negotiated by the Type-C negotiation engine 124, USB extension may be established as described in these incorporated disclosures.

In order to support video communication over the extension medium, the UFP device 104 includes a video extension engine 120 and the DFP device 106 includes a video extension engine 130. Any suitable technique for transmitting the video information over the extension medium may be used. One example of a suitable technique, if video information is DisplayPort information throughout the system 100, is described in commonly owned U.S. Pat. No. 8,549,197, issued Oct. 1, 2013, the entire disclosure of which is hereby incorporated by reference herein for all purposes. Other suitable techniques may including using an analog to digital converter to convert an analog signal from the host device 102 to a digital signal for transmission over the extension medium, or any technique to encapsulate and send digital video information over the extension medium.

FIG. 1 illustrates the video extension connection and the USB extension connection separately for the clarity of the drawing. In some embodiments, the USB extension engine 114 and the video extension engine 120 may share an extension medium interface to transmit and receive information on the extension medium, as may the USB extension engine 122 and the video extension engine 130. The video information and the USB information may be multiplexed together over a single logical connection using packet interleaving, separate IP ports, or any other suitable technique.

The video communication with the sink device 108 is illustrated and explained as DisplayPort only for ease of discussion and to provide a specific example. In other embodiments, some other video technology could be used by the sink device which can also be transmitted via an Alternate Mode USB Type-C connection, such as MHL, Thunderbolt, and/or the like, in a manner particular to the video technology.

Figure 2A:
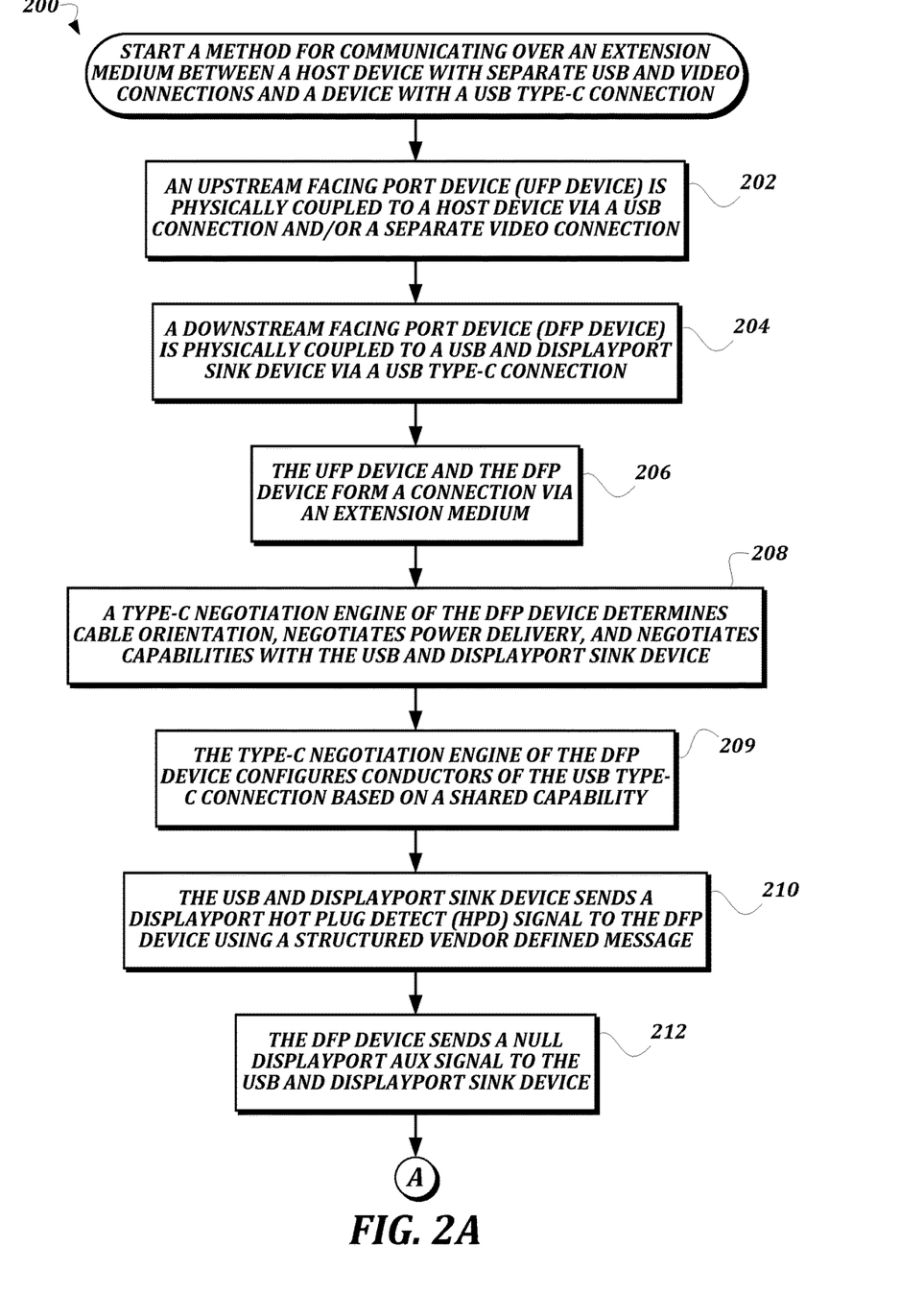
FIGS. 2A-2B are a flowchart that illustrates an exemplary embodiment of a method for communicating over an extension medium between a host device with separate USB and video connections and a USB and DisplayPort sink device with a USB Type-C connection according to various aspects of the present disclosure.
Figure 2B:
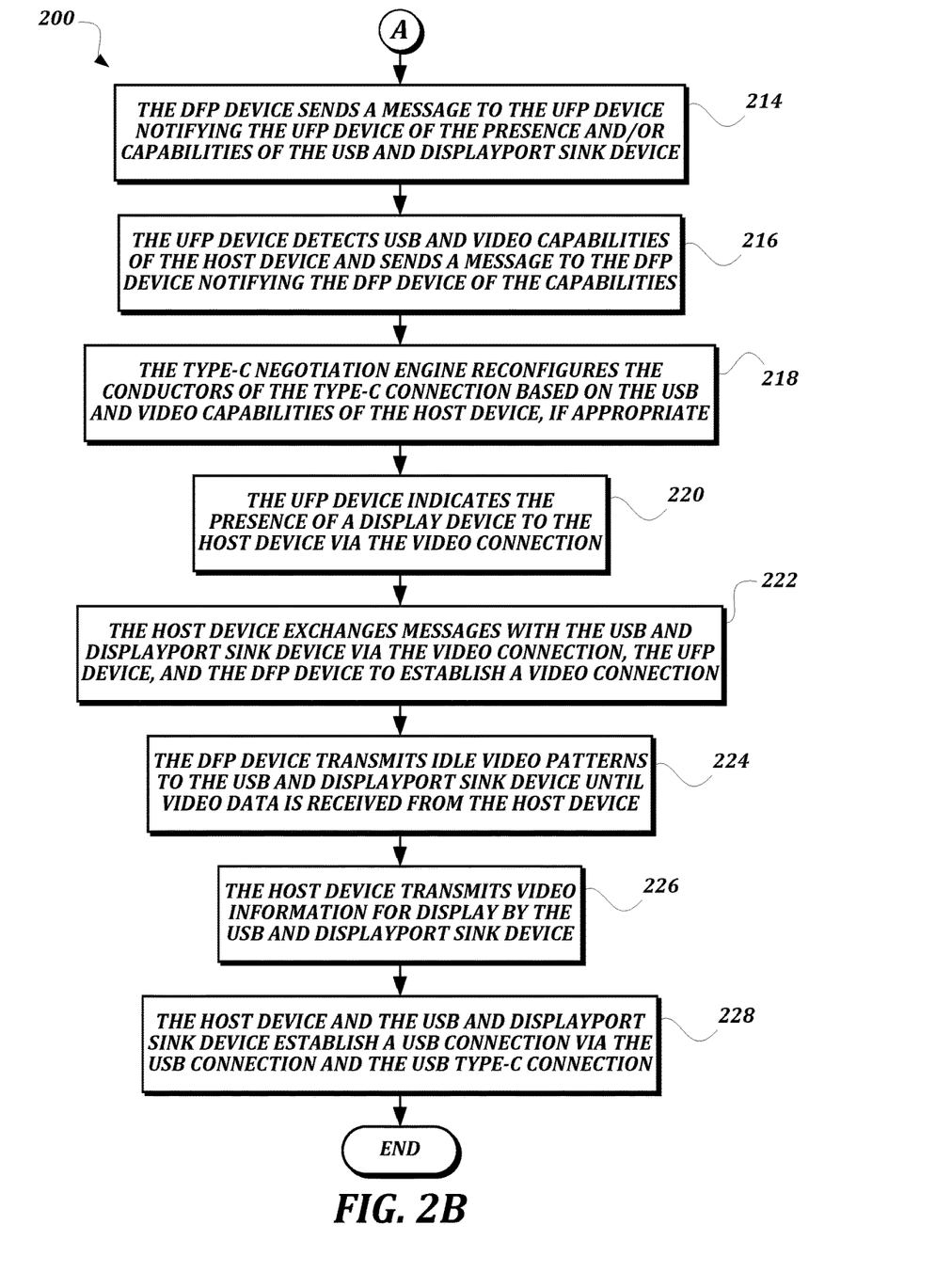

FIGS. 2A-2B are a flowchart that illustrates an exemplary embodiment of a method for communicating over an extension medium between a host device with separate USB and video connections and a USB and DisplayPort sink device with a USB Type-C connection according to various aspects of the present disclosure. One technical problem in supporting a Type-C connection in an extension environment is that the Type-C MUX, which is a component within the Type-C port that selects particular signals from a device to couple to particular pins of the USB Type-C receptacle, is controlled by a connected downstream facing port (such as the USB Type-C downstream facing port 126). However, in the system 100 illustrated in FIG. 1, the DFP device 106 does not initially know what signals will be provided by the host device 102, nor can it use standard USB Type-C techniques to determine the signals that will be provided due to its separation from the host device 102 by the extension medium.

To overcome this technical problem (as well as others), the method 200 may be described at a high level as providing a technique wherein the DFP device 106 first configures the MUX of the USB Type-C downstream facing port 126 to obtain as much information as possible from the USB and DisplayPort sink device 108 about its capabilities, and then optionally reconfigures the MUX of the USB Type-C downstream facing port 126 as appropriate to handle signals actually provided by the host device 102.

From a start block, the method 200 proceeds to block 202, where an upstream facing port device (UFP device) 104 is physically coupled to a host device 102 via a USB connection and/or a separate video connection. The USB connection may be physically established between the USB downstream facing port 110 on the host device 102 and the USB upstream facing port 116 on the UFP device 104. The video connection may be physically established between the video receptacle 112 on the host device 102 and the video receptacle 118 on the UFP device 104. At block 204, a downstream facing port device (DFP device) 106 is physically coupled to a USB and DisplayPort sink device 108 via a USB Type-C connection. The USB Type-C connection may be physically established between the USB Type-C downstream facing port 126 and the USB Type-C upstream facing port 134. At block 206, the UFP device 104 and the DFP device 106 form a connection via an extension medium. In some embodiments, forming the connection via the extension medium may include conducting a handshake protocol across the extension medium that establishes an extension communication path between the devices, as described in the incorporated disclosures.

Though blocks 202, 204, and 206 are ordered in the flowchart 200 for the purposes of discussion, in some embodiments the connections formed at blocks 202, 204, and 206 may be formed in any order, or concurrently in whole or in part. Further, though physical connections are described, in some embodiments, no communication takes place over the physical connections other than the aforementioned handshake protocol until later in the method 200. The method 200 proceeds to block 208 when all of blocks 202, 204, and 206 have been performed.

At block 208, a Type-C negotiation engine 124 of the DFP device 106 determines cable orientation, negotiates power delivery, and negotiates capabilities with the USB and DisplayPort sink device 108. The detection of cable orientation (e.g., through the use of the CC pin) and negotiation of power delivery over the USB Type-C connection are standard techniques, and so are not described further herein. The capabilities negotiated at block 208 are switching capabilities of the USB Type-C downstream facing port 126 and the USB Type-C upstream facing port 134. For example, it may be determined whether both ports support alternate modes, and if so, which modes they support (such as two lanes of DisplayPort information along with USB 2.0 and USB 3.1 or four lanes of DisplayPort only as described in the DisplayPort Alt Mode Standard incorporated above; MHL information along with USB information as described in the MHL Alt Mode specification published by the MHL Consortium; Thunderbolt information along with USB information as described in the Thunderbolt Alternate Mode specification published by Intel Corporation and Texas Instruments; four lanes of DisplayPort along with USB 2.0 and USB 3.0 or 3.1 as described in the Concurrent DisplayPort and USB applications, and/or the like). The capabilities that are supported may be exchanged using USB PD structured vendor defined messages.

Next, at block 209, the Type-C negotiation engine 124 of the DFP device 106 configures conductors of the USB Type-C connection based on a shared capability. In some embodiments, configuring conductors means that the Type-C negotiation engine 124 configures a MUX of the USB Type-C downstream facing port 126 to use a configuration that is supported by both the USB and DisplayPort sink device 108 and the DFP device 106, and sends one or more USB PD structured vendor defined messages to configure a MUX of the USB Type-C upstream facing port 134 to use a corresponding configuration. In some embodiments, the Type-C negotiation engine 124 chooses an alternate mode that allows connection to the most functionality on the USB and DisplayPort sink device 108. For example, if the USB Type-C upstream facing port 134 indicates that it supports an alternate mode that provides USB 2.0, USB 3.0, and two lanes of DisplayPort information; the Type-C negotiation engine 124 will choose that mode over a mode that communicates four lanes of DisplayPort only or a mode that only communicates USB information, because it will allow communication with more functionality of the USB and DisplayPort sink device 108 for configuration purposes.

At block 210, the USB and DisplayPort sink device 108 sends a DisplayPort hot plug detect (HPD) signal to the DFP device 106 using a USB PD structured vendor defined message. This message indicates presence of the DisplayPort sink 136, and is similar to a message sent as defined in the DisplayPort Alt Mode Standard. In some embodiments, presence of the DisplayPort sink 136 may instead be detected through detecting termination of the AUX conductors via the SBU pins of the USB Type-C connection. At block 212, the DFP device 106 sends a null DisplayPort AUX signal to the USB and DisplayPort sink device 108. The null AUX signal indicates to the DisplayPort sink 136 that there is not a DisplayPort source available yet. The null AUX signal may cause the DisplayPort sink 136 to go into a power saving or standby mode. The method 200 then proceeds to a continuation terminal ("terminal A").

From terminal A (FIG. 2B), the method 200 proceeds to block 214, where the DFP device 106 sends a message to the UFP device 104 notifying the UFP device 104 of the presence and/or capabilities of the USB and DisplayPort sink device 108. In some embodiments, the message may simply be intended to inform the UFP device 104 that the DFP device 106 is ready to relay information to the USB and DisplayPort sink device 108. In some embodiments, the message may inform the UFP device 104 of whether USB is supported by the USB and DisplayPort sink device 108, whether video is supported by the USB and DisplayPort sink device 108, both, or neither. Having this information may allow the UFP device 104 to only connect to the ports on the host device 102 that are supported by the USB and DisplayPort sink device 108. In some embodiments, the UFP device 104 may connect to all ports of the host device 102 in case a new USB or video device subsequently becomes available in the system 100 after the initial configuration.

At block 216, the UFP device 104 detects USB and video capabilities of the host device 102 and sends a message to the DFP device 106 notifying the DFP device 106 of the capabilities. In some embodiments, USB capabilities may be detected using standard techniques for detecting the connection of USB devices, including SuperSpeed receiver detection, termination detection, and/or the like. In some embodiments, video capabilities of the host device 102 may be determined by detecting termination resistors on conductors of the video receptacle 112 in order to determine whether or not video is supported or connected.

At block 218, the Type-C negotiation engine 124 reconfigures the conductors of the Type-C connection between the USB Type-C downstream facing port 126 and the USB Type-C upstream facing port 134 based on the USB and video capabilities of the host device 102, if appropriate. For example: the UFP device 104 may determine whether or not SuperSpeed communication (i.e., USB 3.0 or 3.1 communication and/or the like) is supported by the host device 102. If not, the Type-C negotiation engine 124 may reconfigure the Type-C connection to use an Alternate Mode with four lanes of DisplayPort information and no SuperSpeed information to provide additional bandwidth for use by DisplayPort. Otherwise, if the host device 102 does support SuperSpeed communication, the Type-C negotiation engine 124 may leave an Alternate Mode configuration in which both SuperSpeed and DisplayPort information is communicated in place. As another example, if SuperSpeed information and high-resolution DisplayPort information are both supported by the host device 102, the Type-C negotiation engine 124 may change a configuration from a standard DisplayPort alternate mode that only allows concurrent communication of two lanes of DisplayPort along with SuperSpeed to a special Alternate Mode that allows concurrent communication of four lanes of DisplayPort along with SuperSpeed, such as those described in the Concurrent DisplayPort and USB applications. In some embodiments, the DFP device 106 may send an acknowledgement to the UFP device 104 once the actions of block 218 are completed.

Next, at block 220, the UFP device 104 indicates the presence of a display device to the host device 102 via the video connection between the video receptacle 112 and the video receptacle 118. In some embodiments, the UFP device 104 may transmit a hot plug detect (HPD) signal to the video receptacle 112, may present termination resistors to the video receptacle 112, or may use any other suitable technique for allowing the host device 102 to detect the presence of a display device according to the technology used by the video receptacle 112. In some embodiments, the UFP device 104 may wait to indicate the presence of a display device until the acknowledgement of reconfiguration is received from the DFP device 106, in order to avoid the host device 102 attempting to configure elements of the USB and DisplayPort sink device 108 before the expected connections are made.

Once the Type-C negotiation engine 124 has configured the conductors of the Type-C connection at block 218, and presence of a display device is indicated by the UFP device 104 at block 220, the communication paths have been established to allow both video and USB information to be communicated over the extension medium and through the USB Type-C connection. Accordingly, in some embodiments, techniques for establishing video connections over an extension medium similar to those described in other patents, such as commonly owned U.S. Pat. No. 8,549,197, issued Oct. 1, 2013 and hereby incorporated by reference herein in its entirety for all purposes, may be used at this point.

For example, at block 222, the host device 102 may exchanges messages with the USB and DisplayPort sink device 108 via the video connection, the UFP device 104, and the DFP device 106 to establish a video connection. In some embodiments, the messages may include DisplayPort link training messages that are exchanged between the host device 102 and the DisplayPort sink 136 without substantive changes being made by the UFP device 104 or the DFP device 106. In some embodiments, the messages may include EDID messages or DisplayID messages to inform the host device 100 of display capabilities of the DisplayPort sink 136. At block 224, the DFP device 106 transmits idle video patterns to the USB and DisplayPort sink device 108 until video data is received from the host device 102. At block 226, the host device 102 transmits video information for display by the USB and DisplayPort sink device 108, which is relayed by the UFP device 104 and the DFP device 106. In some embodiments, the format of the video information may be converted by the DisplayPort proxy engine 128 to a format consumable by the DisplayPort sink 136. In some embodiments, the DisplayPort proxy engine 128 may simply retransmit incoming signals to the DisplayPort sink 136.

Because the communication path for USB over an extension medium and a USB Type-C connection is also available at this point, at block 228 the host device 102 and the USB and DisplayPort sink device 108 establish a USB connection via the USB connection between the USB downstream facing port 110 and the USB upstream facing port 116, the UFP device 104, the DFP device 106, and the USB Type-C connection between the USB Type-C downstream facing port 126 and the USB Type-C upstream facing port 134. In some embodiments, the actions for establishing the USB connection (or more than one USB connection, such as a USB 2.0 connection along with a USB 3.0 connection, or USB connections to more than one USB device or via more than one DFP device 106, may be similar to those disclosed in one or more of commonly owned U.S. Pat. No. 8,615,611, issued Dec. 24, 2013; U.S. Pat. No. 6,381,666, issued Apr. 30, 2002; U.S. Pat. No. 7,149,833, issued Dec. 12, 2006; U.S. Pat. No. 9,129,064, issued Sep. 8, 2015; U.S. Pat. No. 8,868,792, issued Oct. 21, 2014; U.S. Pat. No. 9,047,418, issued Jun. 2, 2015; and U.S. Pat. No. 8,788,734, issued Jul. 22, 2014; the entire disclosures of which are hereby incorporated by reference herein for all purposes. Further, the actions of block 228 may be performed at any point after the USB Type-C communication path is configured, and so in some embodiments does not wait to be after block 226.

The method 200 then proceeds to an end block and terminates, after which video and/or USB communication may continue as desired.

Figure 3:
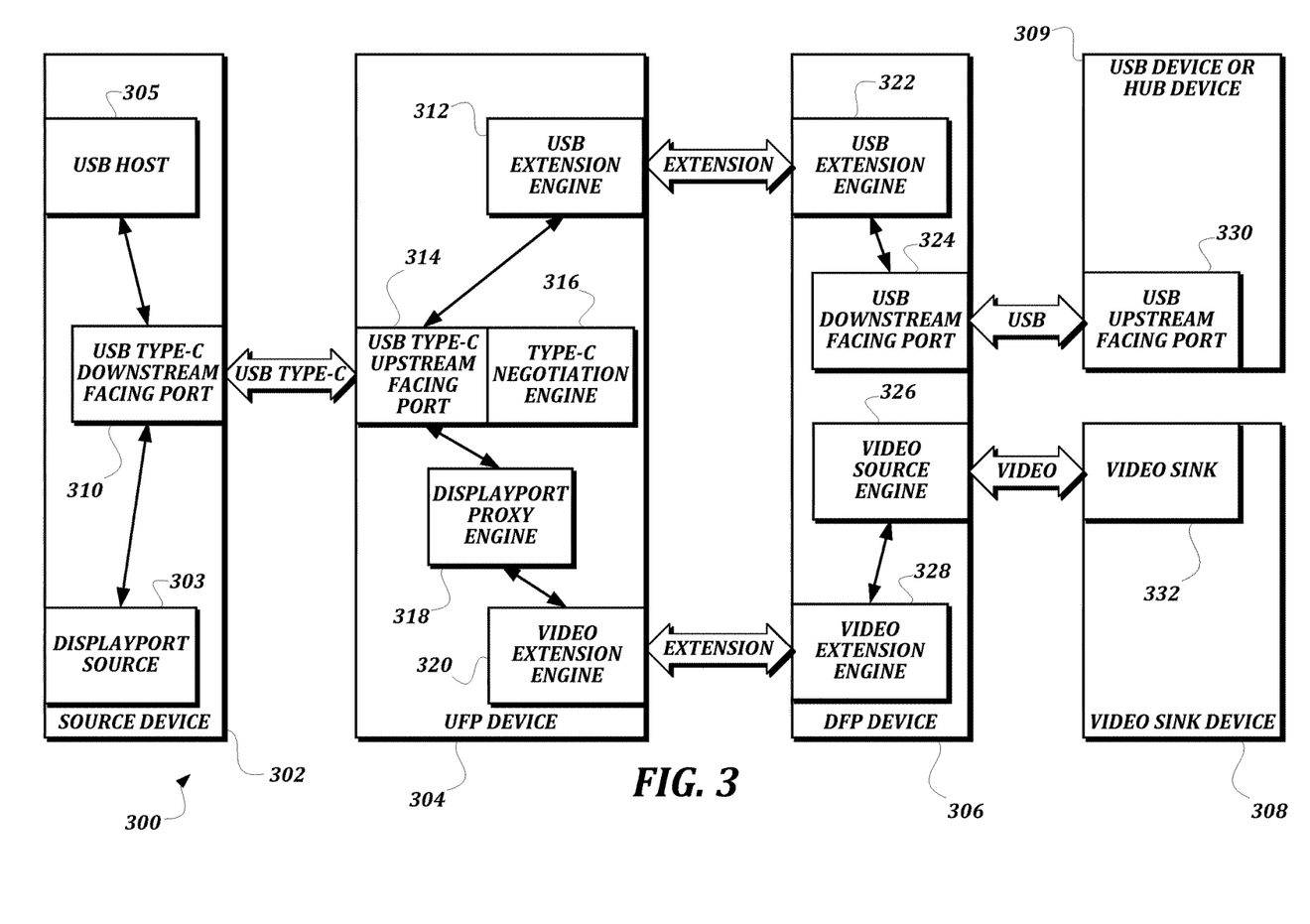
FIG. 3 is a block diagram that illustrates an exemplary embodiment of a system for enabling communication over an extension medium between a host device having a USB Type-C receptacle, a USB device or hub device, and a video sink device according to various aspects of the present disclosure.

FIG. 3 is a block diagram that illustrates an exemplary embodiment of a system for enabling communication over an extension medium between a host device having a USB Type-C receptacle, a USB device or hub device, and a video sink device according to various aspects of the present disclosure. As illustrated, the system 300 includes a source device 302, an upstream facing port device 304 (also called a UFP device, or in some cases, a local extender or LEX), a downstream facing port device 306 (also called a DFP device, or in some cases, a remote extender or REX), a USB device or hub device 309, and a video sink device 308.

In some embodiments, the source device 302 is similar to the host device 102 illustrated in described above, in that it may be any type of computing device that includes the illustrated components, including but not limited to a laptop computing device, a desktop computing device, a tablet computing device, and/or any other type of computing device that includes the illustrated elements. However, though the source device 302 includes a USB host 305 and a DisplayPort source 303, the source device 302 provides access to both the USB host 305 and the DisplayPort source 303 via a single USB Type-C downstream facing port 310, instead of via the two legacy ports illustrated in FIG. 1. The USB host 305 may support any type of USB communication suitable for routing over a USB Type-C connection, including without limitation USB 1.0, USB 1.1, USB 2.0, USB 3.0, and USB 3.1, including combinations thereof such as concurrent USB 2.0 and SuperSpeed communication. The DisplayPort source 303 is illustrated as the video source on the source device 302, but in other embodiments, other video sources could be used, including other video sources for which a USB Type-C Alternate Mode is available, such as MHL, Thunderbolt, and/or the like.

The UFP device 304 includes a USB Type-C upstream facing port 314. In some embodiments, a USB Type-C cable connects the USB Type-C downstream facing port 310 to the USB Type-C upstream facing port 314. In some embodiments, such as those that support an extended Alternate Mode as described in the Concurrent DisplayPort and USB applications, a non-standard cable may be used to connect the USB Type-C downstream facing port 310 with the USB Type-C upstream facing port 314. The UFP device 304 also includes a Type-C negotiation engine 316. The Type-C negotiation engine 316 is configured to negotiate a connection with the USB Type-C downstream facing port 310 that is appropriate for the devices connected to the DFP device 306, as described further below.

The UFP device may also include a DisplayPort proxy engine 318. The DisplayPort proxy engine 318 may emulate a DisplayPort sink device to allow the DisplayPort source 303 to be properly configured. In some embodiments, such as where the video sink 332 is not a DisplayPort sink, the DisplayPort proxy engine 318 may convert to and from formats supported by the DisplayPort source 303. In some embodiments, the DisplayPort proxy engine 318 may simply retransmit DisplayPort information, but may act to help the DisplayPort source 303 and video sink 332 handle delays in transmission via an extension medium.

The DFP device 306 includes a USB downstream facing port 324 and a video source engine 326. The USB device or hub device 309 may be any type of device that supports USB and includes a USB upstream facing port 330, including but not limited to a USB hub device, a web cam, a human interface device (such as a mouse, a keyboard, a touchpad, and/or the like), a storage device, and/or any other type of USB device or hub. The description below may refer to the USB device or hub device 309 as a "USB device" alone for ease of discussion, but one of ordinary skill in the art will recognize that discussion of the USB device or hub device 309 includes hubs as well, unless explicitly stated otherwise. The USB downstream facing port 324 may support any version of USB communication, including but not limited to USB 1.0, USB 1.1, USB 2.0, USB 3.0, and USB 3.1. The USB upstream facing port 330 may also support any of these versions of USB communication. In some embodiments, the USB version of the USB downstream facing port 324 matches the USB version of the USB upstream facing port 330, while in some embodiments, the USB versions implemented by the USB downstream facing port 324 and the USB upstream facing port 330 may be different.

In some embodiments, the video source engine 326 may include a video receptacle that matches a video receptacle of a video sink 332 of a video sink device 308. In some embodiments, the video source engine 326 may include a video receptacle that is compatible with a receptacle of the video sink 332 but does not match it. For example, the video source engine 326 may include a DisplayPort receptacle, while the video sink includes a DVI receptacle, a VGA receptacle, an HDMI receptacle, or another receptacle that can support communication compatible with DisplayPort.

In some embodiments, the UFP device 304 and the DFP device 306 may be connected by an extension medium, as described above. In order to support USB communication over the extension medium, the UFP device 304 includes a USB extension engine 312, and the DFP device 306 includes a USB extension engine 322. As described above, the extension engines may handle event timing issues, connection setup issues, and other issues that would otherwise prevent a USB host 305 from communicating with a USB device 309 via an extension medium. Once the USB Type-C connection is negotiated between the source device 302 and the UFP device 304, USB extension by the UFP device 304 and DFP device may be implemented as described in the incorporated patents and patent applications.

Figure 4A:
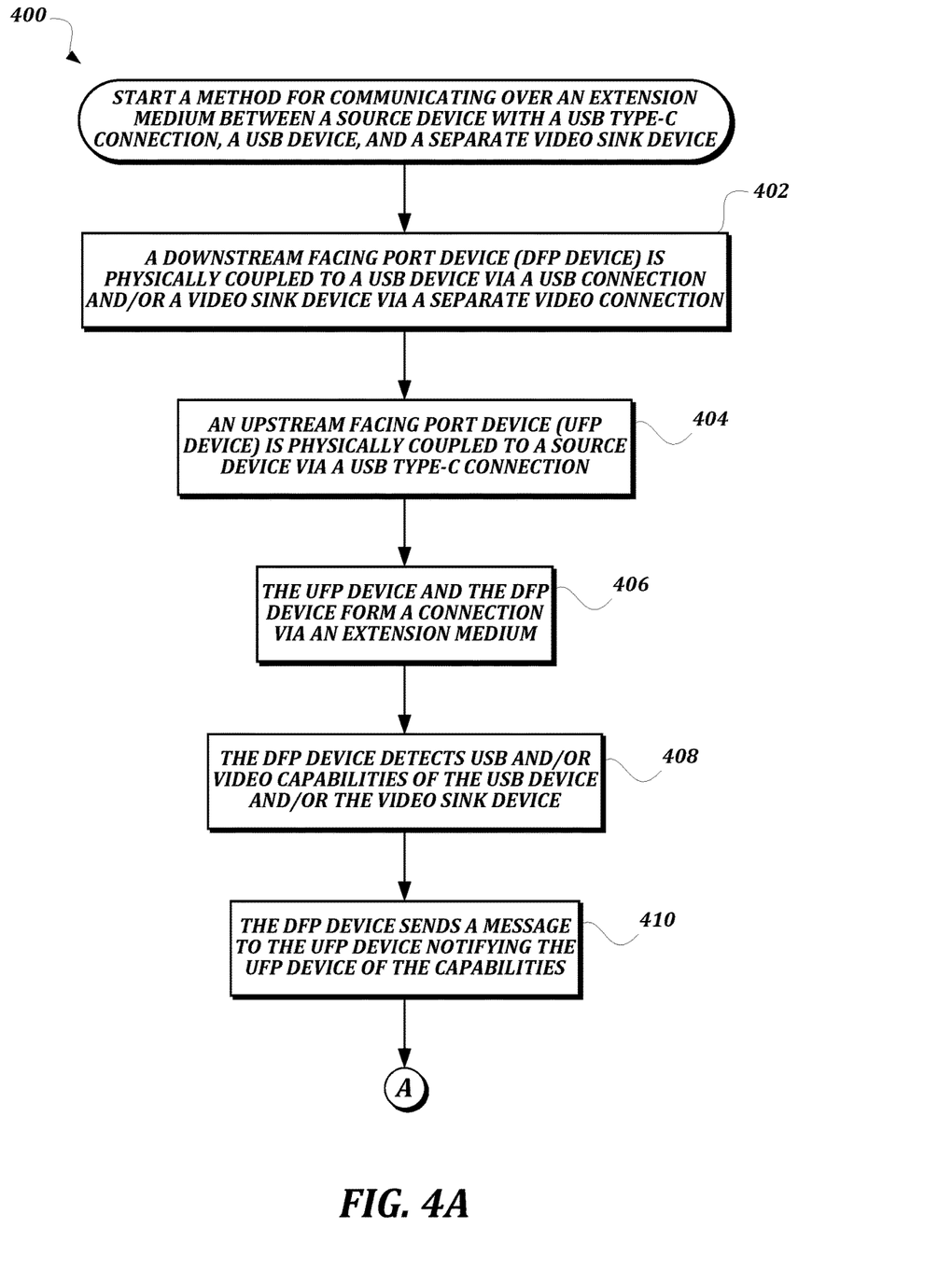
FIGS. 4A-4B are a flowchart that illustrates an exemplary embodiment of a method for communicating over an extension medium between a host device with a USB Type-C connection, a USB device, and a separate video sink device according to various aspects of the present disclosure.
Figure 4B:
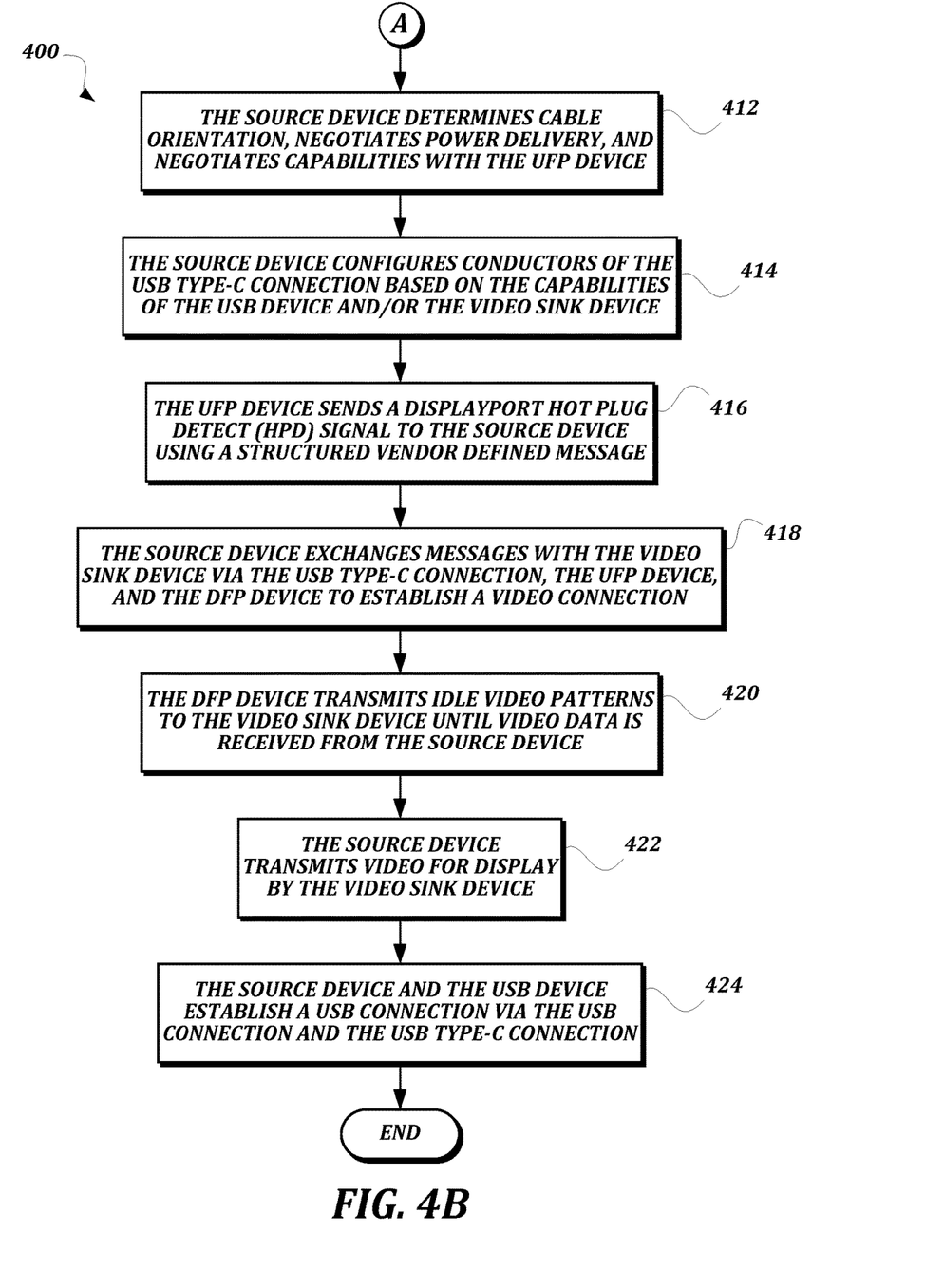

FIGS. 4A-4B are a flowchart that illustrates an exemplary embodiment of a method for communicating over an extension medium between a host device with a USB Type-C connection, a USB device, and a separate video sink device according to various aspects of the present disclosure. As discussed above, one technical problem in supporting a Type-C connection in an extension environment is that the USB Type-C MUX is controlled by a connected downstream facing port (such as the USB Type-C downstream facing port 310). However, in the system 300 illustrated in FIG. 3, the source device 302 does not initially know what legacy devices are connected to the DFP device 306 on the far side of the extension medium, and so cannot reliably configure the USB Type-C MUX.

To overcome this technical problem (as well as others), the method 400 may be described at a high level as providing a technique wherein the DFP device 306 determines capabilities of its connected devices and informs the UFP device 304. The UFP device 304 then presents capabilities to the source device 302 such that the source device 302 can configure the USB Type-C MUX with a capability that will work to establish communications with the attached devices. While it may seem that the most inclusive functionality supported by the UFP device 304 could be configured (such as at block 209 of method 200), in practice this is not guaranteed to work when the USB Type-C MUX is being configured by the source device 302. If a sub-optimal configuration was chosen by the DFP device 106 in method 200, then the connection would be reconfigured by the Type-C negotiation engine 124 at block 218. However, if an unsupported or otherwise sub-optimal configuration is chosen by the source device 302, the Type-C negotiation engine 316 of the UFP device 304 may not be able to reconfigure the Type-C connection because the source device 302 (as a Type-C downstream facing port) is not required to grant reconfiguration requests.

From a start block, the method 400 proceeds to block 402, where a downstream facing port device (DFP device) 306 is physically coupled to a USB device 309 via a USB connection and/or a video sink device 308 via a separate video connection. The USB connection may be physically established between the USB downstream facing port 324 on the DFP device 306 and the USB upstream facing port 330 on the USB device 309. The video connection may be physically established between a video receptacle of the video source engine 326 on the DFP device 306 and a video receptacle of a video sink 332 on the video sink device 308. At block 404, an upstream facing port device (UFP device) 304 is physically coupled to a host device 302 via a USB Type-C connection. The USB Type-C connection may be physically established between the USB Type-C downstream facing port 310 and the USB Type-C upstream facing port 314. At block 406, the UFP device 304 and the DFP device 306 form a connection via an extension medium. In some embodiments, forming the connection via the extension medium may include conducting a handshake protocol across the extension medium that establishes an extension communication path between the devices, as described in the incorporated disclosures.

Though blocks 402, 404, and 406 are ordered in the flowchart 400 for the purposes of discussion, in some embodiments the connections formed at blocks 402, 404, and 406 may be formed in any order, or concurrently in whole or in part. Further, though physical connections are described, in some embodiments, no communication takes place over the physical connections other than the aforementioned handshake protocol until later in the method 400. The method 400 proceeds to block 408 when all of blocks 402, 404, and 406 have been performed.

At block 408, the DFP device 306 detects USB and/or video capabilities of the USB device 309 and/or the video sink device 308. In some embodiments, USB capabilities may be detected using standard techniques for detecting the connection of USB devices, including SuperSpeed receiver detection, termination detection, and/or the like. In some embodiments, video capabilities of the video sink device 308 may be determined by detecting termination resistors on conductors of the video receptacle of the video source engine 326 in order to determine whether or not the video sink device 308 is connected or video is supported. In some embodiments, the video source engine 326 may request EDID information from the video sink device 308.

At block 410, the DFP device 306 sends a message to the UFP device 304 notifying the UFP device 304 of the capabilities. In some embodiments, the capabilities may simply indicate a presence of the USB device 309 and/or the video sink device 308. In some embodiments, the capabilities may indicate further information as well, such as maximum supported bandwidths of the USB device 309 or the video sink device 308, at least portions of the retrieved EDID information, and/or the like. If the video source engine 326 emulates a video source in order to retrieve the EDID information (or other information) from the video sink device 308, the video source engine 326 may present null signals (such as a null DisplayPort AUX signal) to the video sink device 308 to cause the video sink device 308 to wait for further information. The method 400 then proceeds to a continuation terminal ("terminal A").

From terminal A (FIG. 4B), the method 400 proceeds to block 412, where the host device 302 determines cable orientation, negotiates power delivery, and negotiates capabilities with the UFP device 304. As above, determining cable orientation and negotiating power delivery are standard, and so are not described further herein. The negotiated capabilities refer to switching capabilities of the USB Type-C downstream facing port 310 and the USB Type-C upstream facing port 314. Also as above, these capabilities may refer to what alternate modes are supported by both the source device 302 and the UFP device 304. Importantly, and in contrast to method 200, the Type-C negotiation engine 316 only presents capabilities to the source device 302 that align with the determined communication capabilities of the USB device 309 and the video sink device 308. For example, the Type-C negotiation engine 316 may be capable of supporting a DisplayPort alternate mode that allows concurrent communication of two lanes of DisplayPort information along with SuperSpeed information and USB 2.0 information, as well as a DisplayPort alternate mode that allows four lanes of DisplayPort information and USB 2.0 information (without SuperSpeed information). However, if the USB device 309 is determined to not support SuperSpeed communication, the Type-C negotiation engine 316 may only present the capability for four lanes of DisplayPort information (and not the other alternate mode it is nevertheless capable of supporting).

Next, at block 414, the host device 302 configures conductors of the USB Type-C connection based on a shared capability. In some embodiments, configuring conductors means that the source device 302 configures a MUX of the USB Type-C downstream facing port 310 to use a configuration that is supported by both the source device 302 and the UFP device 304, and sends one or more USB PD structured vendor defined messages to configure a MUX of the USB Type-C upstream facing port 314 to use a corresponding configuration.

In some embodiments, the source device 302 may choose a supported configuration in any suitable manner. In some embodiments, the source device 302 may choose to use all of the connected devices, and so may choose a supported configuration that maximizes the number of communication paths. In some embodiments, the source device 302 may choose to ignore one or more of the connected devices, and optimize performance for the other devices. For example, if a SuperSpeed USB device 309 and a video sink device 308 are both connected, the Type-C negotiation engine 316 may present capabilities for both DisplayPort alternate modes to the source device 302. However, the source device 302 may choose to prioritize video information over USB information, and so may choose the four lane DisplayPort alternate mode even though it would mean not being able to connect to the USB device 309 via SuperSpeed. This determination may be made automatically or by a user configuration on the source device 302. In the remainder of the method 400, it is assumed that both USB information and video information is being transmitted for the sake of discussion.

At block 416, the UFP device 304 sends a hot plug detect (HPD) signal to the host device 302 using a USB PD structured vendor defined message. In some embodiments, the UFP device 304 may provide some other signal to the host device 302 that indicates the presence of a video sink device 308, such as AUX termination and/or the like. Unlike the method 200, block 416 does not wait for a reconfiguration notification from the DFP device 306, because there is no MUX on the DFP device 306. Further, all such configurations are controlled by host device 302 in method 400, and it can be assumed at this point in the method 400 that the video sink device 308 was already detected.

Once the source device 302 has configured the USB Type-C connection at block 414 and the presence of the display device is indicated to the source device 302 at block 416, the communication paths have been established to allow both video and USB information to be communicated over the extension medium and through the USB Type-C connection. Accordingly, in some embodiments, techniques similar to those discussed and incorporated above for establishing video connections over an extension medium may be used at this point.

For example, at block 418, the host device 302 may exchange messages with the video sink device 308 via the USB Type-C connection, the UFP device 304, and the DFP device 306 to establish a video connection. In some embodiments, the messages may include DisplayPort link training messages that are exchanged between the source device 302 and the video sink device 308 without substantive changes being made by the UFP device 304 or the DFP device 306. In some embodiments, the messages may include EDID messages or DisplayID messages to inform the source device 302 of display capabilities of the video sink device 308. At block 420, the DFP device 306 transmits idle video patterns to the video sink device 308 until video data is received from the host device 302. At block 422, the host device 302 transmits video information for display by the video sink device 308. In some embodiments, the format of the video information may be converted by the DisplayPort proxy engine 318 to a format consumable by the video sink 332. In some embodiments, the DisplayPort proxy engine 318 may simply retransmit incoming signals to the video sink 332.

Because the communication path for USB over an extension medium and a USB Type-C connection is also available at this point, at block 424 the host device 302 and the USB device 309 establish a USB connection via the USB connection between the USB downstream facing port 324 and the USB upstream facing port 330, the DFP device 306, the UFP device 304, and the USB Type-C connection between the USB Type-C downstream facing port 310 and the USB Type-C upstream facing port 314. In some embodiments, the actions for establishing the USB connection (or more than one USB connection, such as a USB 2.0 connection along with a USB 3.0 connection, or USB connections to more than one USB device or via more than one DFP device 306, may be similar to those disclosed in U.S. Pat. No. 8,615,611, issued Dec. 24, 2013; U.S. Pat. No. 6,381,666, issued Apr. 30, 2002; U.S. Pat. No. 7,149,833, issued Dec. 12, 2006; U.S. Pat. No. 9,129,064, issued Sep. 8, 2015; U.S. Pat. No. 8,868,792, issued Oct. 21, 2014; U.S. Pat. No. 9,047,418, issued Jun. 2, 2015; and U.S. Pat. No. 8,788,734, issued Jul. 22, 2014; each of which was incorporated above. Further, the actions of block 424 may be performed at any point after the USB Type-C communication path is configured, and so in some embodiments does not wait to be after block 422.

The method 400 then proceeds to an end block and terminates, after which video and/or USB communication may continue as desired.

In general, the term "engine" as used herein refers to logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C#, and/or the like. An engine may be compiled into executable programs or written in interpreted programming languages. Engines may be callable from other engines or from themselves. Generally, the engines described herein refer to logical modules that can be merged with other engines, or can be divided into sub-engines. The engines can be stored in any type of computer readable medium or computer storage device and be stored on and executed by one or more general purpose computers, thus creating a special purpose computer configured to provide the engine. In some embodiments, one or more of the engines described herein may be implemented within a logic device such as a PLD, an ASIC, a FPGA, and/or the like. In some embodiments, one or more of the engines described herein may be implemented using a dedicated digital hardware device implemented, for example, as a state machine configured to perform the actions described herein; within an application specific processor; and/or within any other suitable computing device.

While illustrative embodiments have been illustrated and described, it will be appreciated that various changes can be made therein without departing from the spirit and scope of the invention. For example, in some embodiments, at least some aspects of a UFP device or DFP device as described above could be embedded in an active cable instead of being provided as a separate device. As another example, in some embodiments, the UFP device and DFP device could be connected with a standard cable, instead of being separated by an extension medium.

The embodiments of the invention in which an exclusive property or privilege is claimed are defined as follows:

1. A system, comprising:
   an upstream facing port device (UFP device) that includes:
      a USB upstream facing port; and
      a video receptacle; and
   a downstream facing port device (DFP device) that includes a USB Type-C downstream facing port;
   wherein the UFP device and the DFP device are configured to communicate via an extension medium;
   wherein the UFP device and the DFP device are further configured to enable a host device coupled to the UFP device and a USB and DisplayPort sink device coupled to the DFP device to communicate USB and video information via the extension medium; and
   wherein the DFP device is further configured to:
      receive a message from the UFP device regarding capabilities of the host device; and
      configure the conductors of the USB Type-C downstream facing port based on the capabilities of the host device.

2. The system of claim 1, wherein the DFP device is further configured to, before receiving the message from the UFP device regarding capabilities of the host device:
   determine capabilities of the USB and DisplayPort sink device; and
   configure conductors of the USB Type-C downstream facing port to be used for video and USB communication based on the capabilities of the USB and DisplayPort sink device.

3. The system of claim 1, wherein the DFP device is further configured to:
   receive a structured vendor defined message from the USB and DisplayPort sink device that represents a hot plug detect (HPD) signal; and
   transmit a message to the UFP device via the extension medium indicating the presence of the USB and DisplayPort sink device.

4. The system of claim 3, wherein the UFP device and the DFP device are further configured to exchange link training messages sent between a video source coupled to the video receptacle of the UFP device and the USB and DisplayPort sink device.

5. The system of claim 4, wherein the DFP device is further configured to transmit a null DisplayPort AUX signal to the USB and DisplayPort sink device until the link training messages are received by the DFP device.

6. The system of claim 5, wherein the DFP device is configured to transmit idle video patterns to the USB and DisplayPort sink device until video data is received by the DFP device from the video source.

7. A method of enabling a host device coupled to an upstream facing port device (UFP device) via an USB upstream facing port of the UFP device and a video receptacle of the UFP device to communicate USB information and video information with a USB and DisplayPort sink device coupled to a USB Type-C downstream facing port of a downstream facing port device (DFP device), wherein the UFP device and the DFP device are configured to communicate via an extension medium, the method comprising:
   receiving, by the DFP device, a structured vendor defined message from the USB and DisplayPort sink device that represents a hot plug detect (HPD) signal;
   transmitting, by the DFP device to the UFP device, a message via the extension medium indicating the presence of the USB and DisplayPort sink device; and
   in response to receiving the message, transmitting, by the UFP device, an attachment message to the host device.

8. The method of claim 7, further comprising:
   determining, by the DFP device, capabilities of the USB and DisplayPort sink device; and
   configuring, by the DFP device, conductors of the USB Type-C downstream facing port to be used for video and USB communication based on the capabilities of the USB and DisplayPort sink device.

9. The method of claim 8, further comprising:
   receiving, by the DFP device from the UFP device, a message regarding capabilities of the host device; and
   reconfiguring, by the DFP device, the conductors of the USB Type-C downstream facing port based on the capabilities of the host device.

10. The method of claim 7, further comprising:
    exchanging, by the UFP device and the DFP device, link training messages sent between a video source coupled to the video receptacle of the UFP device and the USB and DisplayPort sink device.

11. The method of claim 10, further comprising:
    transmitting, by the DFP device, a null DisplayPort AUX signal to the USB and DisplayPort sink device until the link training messages are received by the DFP device.

12. The method of claim 11, further comprising:
    transmitting, by the DFP device, idle video patterns to the USB and DisplayPort sink device until video data is received by the DFP device from the video source.

13. A downstream facing port device (DFP device) that includes a USB Type-C downstream facing port and is configured to:
    communicate with an upstream facing port device (UFP device) via an extension medium;
    receive a message from the UFP device regarding capabilities of a host device coupled to at least one of a USB upstream facing port of the UFP device and a video receptacle of the UFP device;
    configure the conductors of the USB Type-C downstream facing port based on the capabilities of the host device; and
    enable the host device to communicate USB and video information with the USB and DisplayPort sink device via the extension medium.

14. The DFP device of claim 13, wherein the DFP device is further configured to:
    before receiving the message from the UFP device regarding capabilities of the host device:
       determine capabilities of a USB and DisplayPort sink device coupled to the USB Type-C downstream facing port; and
       configure conductors of the USB Type-C downstream facing port to be used for video and USB communication based on the capabilities of the USB and DisplayPort sink device.

15. The DFP device of claim 13, wherein the DFP device is further configured to:
    receive a structured vendor defined message from the USB and DisplayPort sink device that represents a hot plug detect (HPD) signal; and transmit a message to the UFP device via the extension medium indicating the presence of the USB and DisplayPort sink device.

16. The DFP device of claim 15, wherein the DFP device is further configured to exchange link training messages with the UFP device via the extension medium sent between a video source coupled to the video receptacle of the UFP device and the USB and DisplayPort sink device.

17. The DFP device of claim 16, wherein the DFP device is further configured to transmit a null DisplayPort AUX signal to the USB and DisplayPort sink device until the link training messages are received by the DFP device.

18. The DFP device of claim 17, wherein the DFP device is further configured to transmit idle video patterns to the USB and DisplayPort sink device until video data is received by the DFP device from the video source.

* * * * *